United States Patent Office 2,800,981
Patented July 30, 1957

2,800,981
TELESCOPIC HYDRAULIC SHOCK-ABSORBER

Fernand Stanislas Allinquant, Paris, France

Application April 8, 1955, Serial No. 500,256

Claims priority, application France April 16, 1954

5 Claims. (Cl. 188—88)

It is a well known fact that in telescopic hydraulic shock absorbers the damping is produced by the resistance opposed to the flow of oil by passageways cut through the piston. If said passageways have a constant cross-sectional area, the resistance increases in proportion with the speed of flow as shown by the laws of hydraulics; it is considerable in the case of a sudden shifting of the piston. When the shock absorber is used in cooperation with an automobile spring suspension, said resistance which becomes too considerable during such sudden movements causes the suspension to be devoid of yieldingness at the moment of a shock.

To cut out this drawback, it has been proposed to provide a passage of variable cross-sectional area through the piston. In a prior known arrangement, the piston is constituted by a hollow body inside which an axially sliding member carries an outer flange so as to be held normally between two springs acting in opposite directions in a substantially stable position for which the outer flange on the sliding member registers with another, inner flange rigid with the piston body so as to define therewith an annular passageway of a predetermined restricted area. During the normal movements of the spring suspension, the value of the damping is defined by the resistance of said normal annular passageway. In contradistinction and in the case of a shock when the excess pressure built up in the oil opposes the movement of the piston, the movable flange assumes a relative movement in the opposite direction, which increases the cross-sectional area of the passageway and reduces the resistance against the flow of oil at a high speed. The movements due to somewhat considerable shocks are thus damped to a comparatively smaller extent during that portion of the stroke in which the piston moves at a high speed than when nearing the ends of the travel of the piston at which moments the speed of the piston is reduced, assuming the flange has then returned into its normal position. Nothing prevents therefore the spring suspension from executing movements of a considerable amplitude in the case of an important shock while the suspension retains its full elasticity.

This theoretical manner of operating may however be disturbed by the delay of the flange when returning into its normal position. If said flange has not yet reached said normal position at a moment at which the direction of movement of the piston has already been reversed, the pressure produced in the oil and opposing this reversed direction of movement of the piston will urge said flange into said normal position; in other words, it will cause the cross-sectional area of the passageway to pass first through a minimum value before it assumes the value corresponding to the speed of the piston. The damping instead of being reduced during the high speed movement of the piston would pass thus first through a peak value which would disturb the uniformity of the oscillations of the suspension which would thus be submitted to jerks. Now, my present invention has for its chief object to cut out this drawback.

According to an essential feature of my invention, there is provided a restricted annular passageway through the piston between two movable coaxial flanges which are submitted on their opposite surfaces to the pressures prevailing on the corresponding sides of the piston and which are elastically stabilized and held against stops facing opposite directions so that said flanges occupy positions in which they register with each other and out of which they may move in opposite directions so as to produce through their relative shifting an increase in the cross-sectional area of said annular passageway between them. Thus if, during a rapid movement of the piston in one direction, the pressure arising in the body of oil and opposing the movement of the piston has shifted one of the flanges away from its stop-engaging position, the pressure exerted in the opposite direction on the two flanges, when the movement of the piston is reversed before the first mentioned flange has returned into its normal position, may produce a shifting of the second flange which allows the passageway to retain a cross-sectional area which is larger than normal while the first mentioned flange is returning to its inoperative position. Consequently, in the case of a rapid movement, if the shifted flange has not returned into its inoperative position before the piston has reached the end of its stroke, this has merely as a result a lesser damping of the movement of the piston at the end of its stroke. However, the reduction of the damping during the part of the stroke corresponding to a higher speed movement is always ensured by the relative movement of the two flanges so that the desired elasticity of the suspension is permanently retained.

I will now describe a number of embodiments of the invention, reference being made to accompanying drawings wherein.

Figure 1:
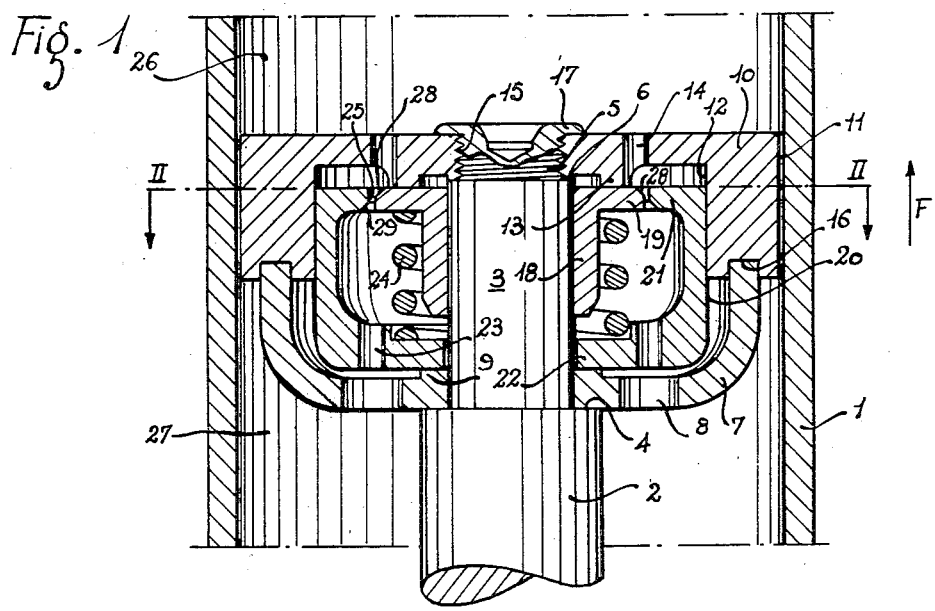
Fig. 1 is an axial cross-section of a portion of the cylinder of a telescopic hydraulic shock absorber, containing a piston according to a first embodiment of the invention.
Figure 2:
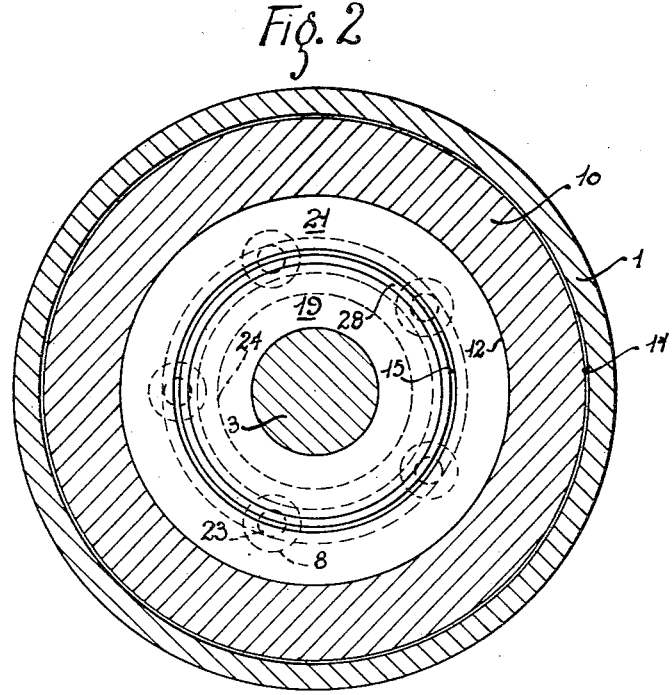
Fig. 2 is a plan view in a plane defined by the section line II—II.

Turning first to Figs. 1 and 2, the cylinder of the shock absorber is shown at 1 and only that portion thereof is illustrated, which registers with the location of the piston at a predetermined moment. The piston rod 2 has its section 3 cut from the bar to a smaller diameter, starting from a shoulder 4 and up to the threaded terminal section 5 having a still smaller diameter beyond the shoulder 6 and extending above this section 3 cut from the bar. The piston head secured to said small diameter section 3 of the piston rod includes two parts assembled together. One of said parts 7 is cup-shaped; it is fitted over the smooth section 3 of the piston rod 2 and bears against the shoulder 4. It is provided with perforations 8 and carries an inner central tubular boss 9 fitted on the rod section 3. The other part of the piston head 10 has an outer cylindrical surface 11 the diameter of which corresponds with that of the cylinder bore with a slight clearance therebetween, of a predetermined value. This second part of the piston head is annularly bored at 12, the bottom of the bore carrying an annular projection 13 and being provided with an annular series of perforations 14 and with a central tapped opening 15. Said second part of the piston head is fitted over the cooperating edge of the cup-shaped part 7 through the groove 16 formed annularly in said second part of the piston head 10 and the tapped opening in said second part is screwed over the terminal threaded section 5 of the piston rod until said second part engages the shoulder 6 after which said second part is finally held fast in position by riveting the threaded terminal rod section 15 at 17 over the piston head.

In the recess formed in the piston head between the two parts thereof, which recess communicates with the oil in the cylinder to either side of the piston through the perforations 8 and 14 respectively, are housed two axially sliding members. One of these members is constituted by a sleeve 18 slidably carried by the rod section 3 and rigid with an outer flange 19; the other sliding member is box-shaped; its outer cylindrical wall 20 slides inside the bore 12 in the piston head and is rigid with an inner annular flange 21 the diameter of the opening in which is larger than the diameter of the flange 19; said box-shaped member includes further a cover 22 at the end opposed to the flange 21, which cover is fitted over the rod section 3 and is provided with an annular series of perforations 23.

Between the two sliding members is mounted a spring 24 urging them apart, the first member being urged by said spring into a position in which the flange 19 engages the stop formed by the annular projection 13 while the second sliding member is urged into abutment through its cover 22 against the boss 9 on the piston part 7.

When the two sliding members are in their abutment positions, the flanges 19 and 21 on said members register and form between them a constricted passageway 25 connecting the two cylinder spaces 26 and 27 located to either side of the piston, through the agency on the one hand of the perforations 14 and on the other hand of the perforations 23 and 8. The surfaces of the two flanges facing opposite directions are submitted to the pressure prevailing in the said spaces, respectively 26 and 27. It is apparent that the two flanges 19 and 21 may move away from their normal abutment positions in opposite directions while compressing the spring 24, whereby the length of the annular passageway is first gradually reduced and its breadth is subsequently increased. Bevelled surfaces 28 and 29 formed on one side of one flange and on the opposite side of the other flange reduce the length of travel required for producing a widening of the cross-sectional area of this passageway.

During operation, the flanges register with each other in their normal coplanar position as long as the difference between the pressures in the spaces 26 and 27, exerted on the corresponding sliding members rigid with said flanges, does not produce a thrust the direction of which is opposed to and which has a value above that of the thrust exerted by the spring 24. This occurs when the piston moves slowly; the flanges occupy then their normal abutment positions and the damping corresponds to the resistance opposing the flow as provided by the annular constricted passageway 25 between the flanges registering with each other. In contradistinction, when the piston moves at a higher speed, the considerable thrust exerted by the said piston on the liquid which opposes its movement produces in said liquid a high pressure which may cause the resulting thrust exerted on one of the members sliding against the spring 24 to become dominant. Said member moves then until it reaches a position of equilibrium so as to reduce the relative value of the damping and then, when the pressure considered has been reduced while the piston slows down as it nears the end of its stroke, the shifted member may return into its normal position so as to restore the damping to its normal value.

However, the piston may reach the end of its forward stroke before the shifted flange has returned into its actual normal position. In this case, it is still far from this position when the piston has initiated its travel in the opposite direction and the dominant pressure is that prevailing in the space facing the other member. For instance, during the stroke considered as a compression stroke and the direction of which is illustrated by the arrow F, the flange 19 is shifted inside the piston head in a direction opposed to said arrow by the excess pressure in the space 26 and has not returned yet into its abutment position at the moment at which the piston is already moving against the arrow F during its return stroke whereby the pressure in the space 27 is now the dominant pressure. The resulting thrust exerted on the member rigid with the flange 19 will add its action to the returning action of the spring in the direction of the arrow F, but if the speed of the piston is already high enough to make a reduction in the damping value desirable, the resulting thrust exerted on the other sliding member carrying the flange 21 will shift simultaneously the last-mentioned flange in the direction of the arrow F and consequently the return of the flange 19 into its abutment position does not prevent the annular passageway from widening at the same time by reason of the relative movement of the flange 21.

Obviously, a symmetrical sequence of relative movements may be produced when the piston finishes a return stroke and initiates a compression stroke. In short, the relative positions of the flanges depend at every moment only on the difference between the pressures prevailing in the spaces 26 and 27 to either side of the piston without their positions with reference to the actual piston head interfering whereby the duration of their movements has no longer any influence on the accurate operation of the arrangement.

It is possible to provide a difference between the action of the pressures producing a widening of the passageway, according as to whether the piston is executing a compression stroke or a return stroke, although the arrangement includes a single return spring for the two sliding members provided each with a flange. To this end, it is sufficient to select different areas for the surfaces on which the pressures act efficiently in the case of each sliding member. Preferably the larger area will be that provided on the flange moving during the compression stroke so that the opening may be executed more easily during said compression stroke than during the return stroke.

Figure 3:
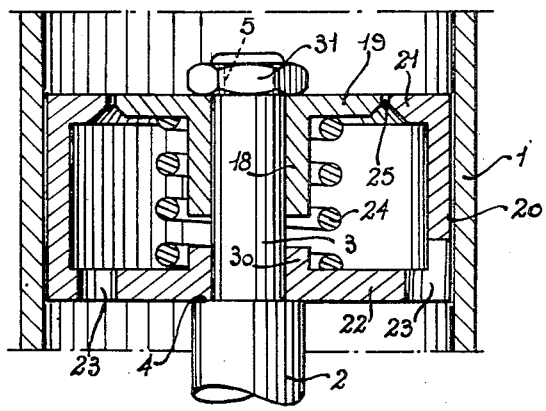
Fig. 3 is an axial cross-section through a piston according to a second embodiment of my invention.
Figure 4:
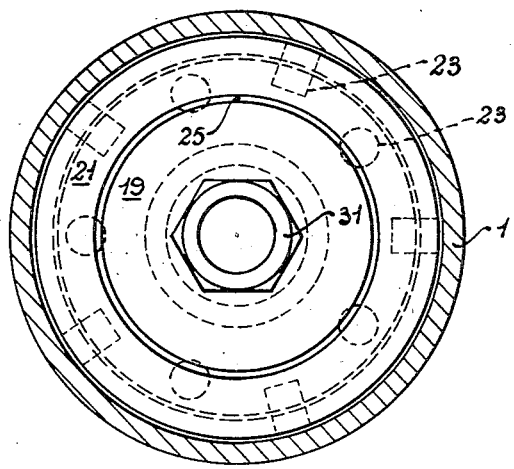
Fig. 4 is a corresponding plan view.

In the embodiment illustrated in Fig. 3, the head of the piston is constituted by the two sliding members themselves; in other words, the outer diameter of the cylindrical section 20 of the box-shaped member is equal to that of the cylinder bore minus the allowance for the desired clearance. Said box-shaped member slides in this case as precedingly over the small diameter section of the piston rod and its cover 22 includes a tubular central bore 30 slidingly fitted over said section 3. The stop for said member is constituted by the shoulder 4 while the other member 18—19 is adapted to abut against a nut 31 screwed over the threaded terminal section 5 on the piston rod, said nut being held fast on the said terminal section through riveting.

The operation is the same as that described precedingly with reference to the embodiment illustrated in Fig. 1; obviously the relative arrangement of the two flanged members may be reversed—in other words the member 18—19 may abut against the shoulder 4 of the piston rod while the member 20—21—22 may abut against the nut 3 on the threaded terminal section of the piston.

Figure 5:
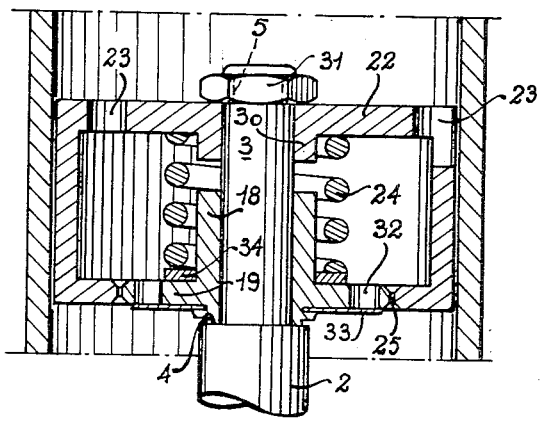
Fig. 5 is a view similar to Fig. 3, of a modification.

This reversed arrangement is illustrated in Fig. 5. Furthermore, the flange 19 rigid with the sliding member 18 is provided with discharge ports 32 which are normally closed by the flap valve constituted for instance by a washer of sheet metal 33 held centrally of the piston rod through setting. The ports 32 in the flange 19 allow a speedy reduction in the pressure when the latter assumes an excess value as a consequence of a violent shock which starts the suspension operating and initiates a compression stroke for the piston.

In all the precedingly described embodiments, the stress of the common spring returning the two flanges into their inoperative positions may be adjusted by fitting washers, such as the washer 34 shown in Fig. 5, underneath one of the ends of the spring 24.

What I claim is:

1. A shock absorber comprising a cylinder and a piston reciprocable in said cylinder, said piston comprising a piston rod, means on said rod providing axially spaced abutments, and a piston head comprising a cylindrical box-shaped member slidable axially of said rod and having an apertured cover at one end and an inwardly directed flange at the opposite end, a second axially slidable member having a cylindrical collar portion slidable on said rod and an outwardly directed flange of slightly smaller diameter than said inwardly directed flange, said members being engageable respectively with said abutments and said abutments being so positioned that said flanges are adjacent one another to form a restricted passageway between them, and spring means between said members resiliently retaining said members on their respective abutments, said members being movable by fluid pressure in opposite directions respectively against said spring means to provide a larger opening between said flanges.

2. A shock absorber according to claim 1, in which said spring means is a single helical compression spring around said rod and acting at its opposite ends on said members.

3. A shock absorber according to claim 1, in which said members have different cross sectional areas subjected to fluid pressure generated in said cylinder by relative movement of said piston and cylinder.

4. A shock absorber comprising a cylinder and a piston reciprocable in said cylinder, said piston comprising a piston rod; two cup-shaped parts assembled facing one another and clamped on said rod coaxial therewith, said cup-shaped parts having apertured bottoms and forming a hollow piston head with a cylindrical bore, a box-shaped member having a lateral wall sliding within said bore and formed at one end with an apertured cover normally abutting one of said bottoms and at the opposite end with an inwardly-directed flange, a second member sliding on said rod inside said box-shaped member and having an outwardly directed flange normally abutting the other of said bottoms and disposed inside said inwardly directed flange with a restricted space between said flanges and spring means between said members resiliently holding said members in abutment respectively with said bottoms, said members being movable by fluid pressure in opposite directions respectively against said spring means to provide a larger opening between said flanges.

5. A shock absorber comprising a cylinder and a piston reciprocable in said cylinder, said piston comprising a piston rod, means on said rod providing axially spaced abutments and a piston head on said rod, said head comprising a cylindrical box-shaped member slidable on said rod, and engaged with one of said abutments, said member having a lateral wall sliding within said cylinder, an apertured cover at one end and an inwardly directed flange at the opposite end, a second member slidable on said rod and engageable with the other of said abutments, said second member being formed with an outwardly directed flange which is disposed inside said inwardly directed flange with a restricted space between said flanges when said members are in engagement respectively with said abutments, and spring means between said members resiliently retaining said members against their respective abutments, said members being movable by fluid pressure in opposite directions respectively against said spring means to provide a larger opening between said flanges.

References Cited in the file of this patent

UNITED STATES PATENTS

| 2,060,590 | Padgett | Nov. 10, 1936 |
| 2,538,375 | Montgomery | Jan. 16, 1951 |

FOREIGN PATENTS

| 1,034,713 | France | Apr. 15, 1953 |
| 1,064,843 | France | Dec. 30, 1953 |